Aug. 2, 1949. J. C. BEIRISE 2,477,569
AUTOMATICALLY RELEASING AIRCRAFT TOWING GEAR
Filed June 14, 1944 2 Sheets-Sheet 2
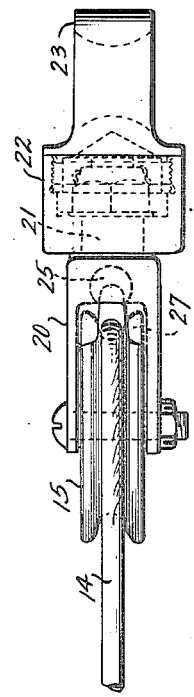
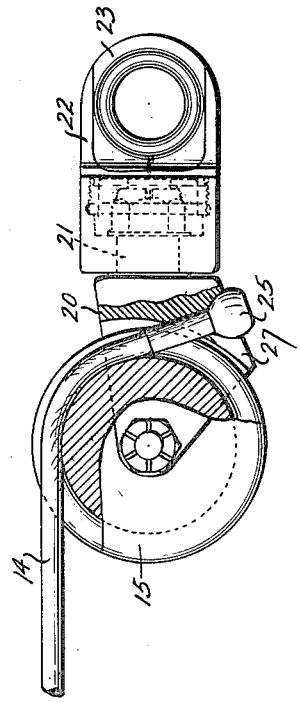
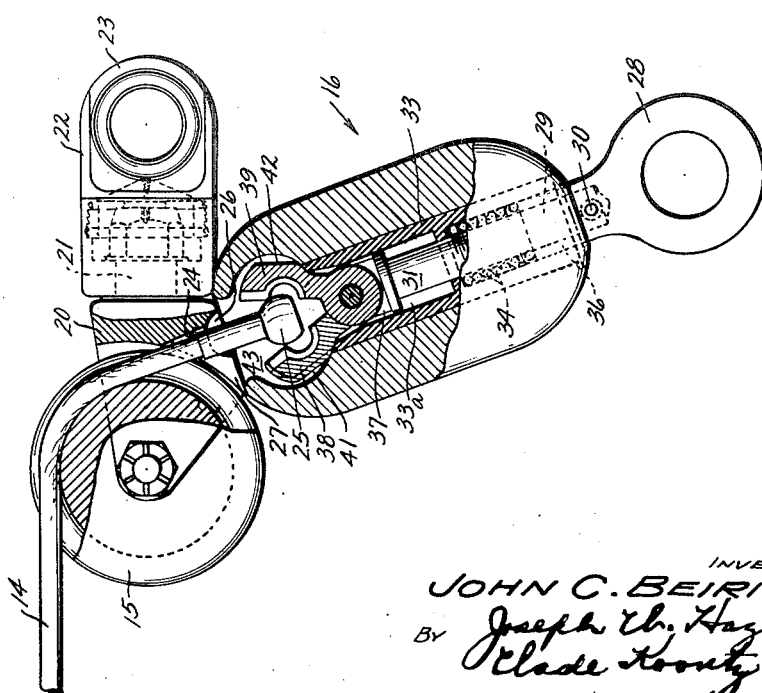
INVENTOR
JOHN C. BEIRISE Patented Aug. 2, 1949

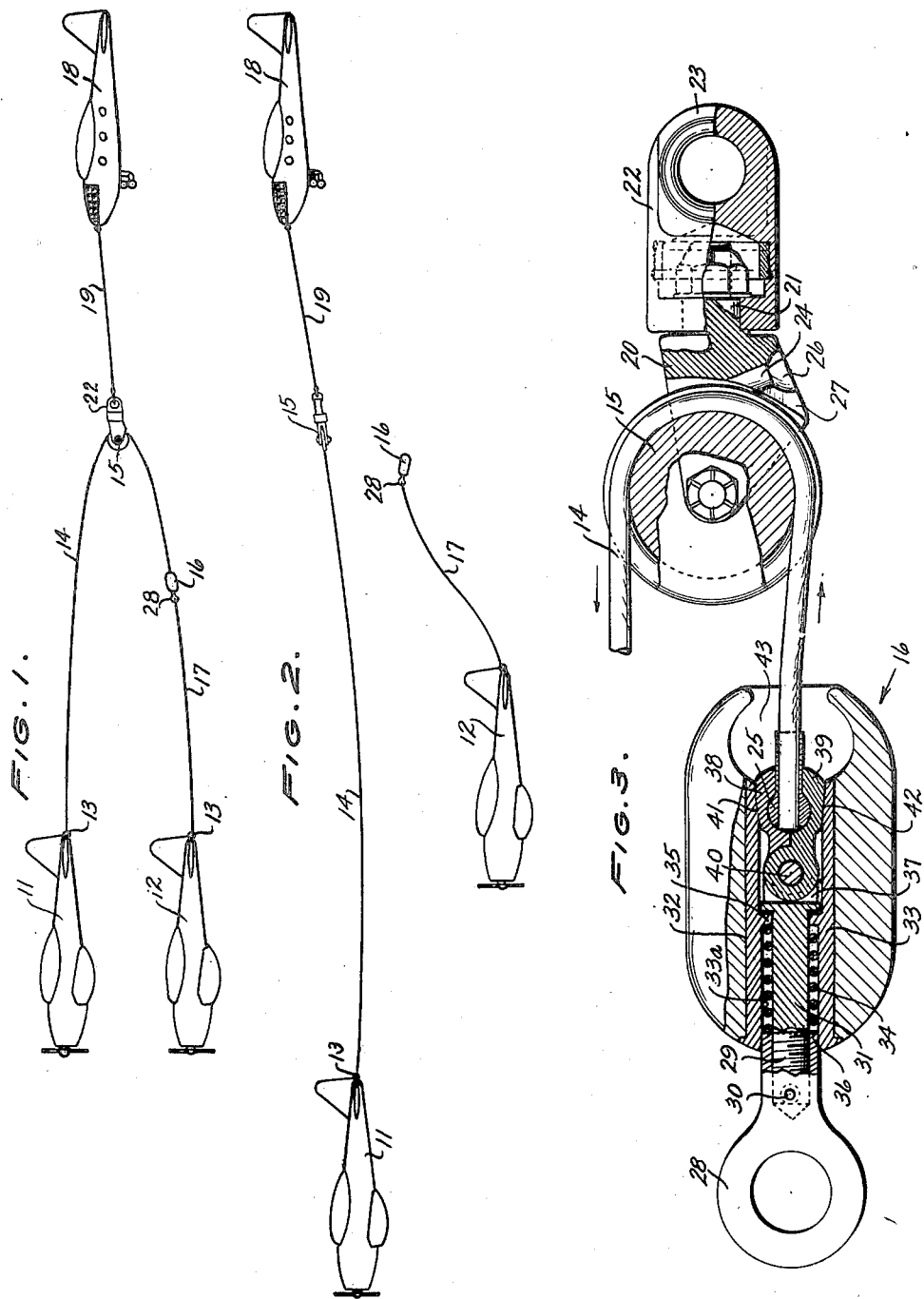

2,477,569

UNITED STATES PATENT OFFICE 2,477,569

AUTOMATICALLY RELEASING AIRCRAFT TOWING GEAR

John C. Beirise, Dayton, Ohio

Application June 14, 1944, Serial No. 540,287

3 Claims. (Cl. 280—33.16)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to automatically releasing aircraft towing gear. It is well known that gliders and sometimes airplanes are launched with the aid of a tractor airplane. Heavily loaded gliders taking off from small airfields or from large fields damaged by bombardments may require two tractor airplanes to get each of them in the air. Once a heavily loaded glider is in the air, the towing load is much smaller than the reaction to the acceleration of launching; hence it is desirable to disconnect one of the two tractor airplanes (which may return to the base) and continue towing of the glider with the other airplane. It is further desirable to provide a gear which will permit two tractor airplanes to launch a glider, or other aircraft, and which will permit the pilot of one tractor airplane, by merely controlling the aircraft in the usual way, to disengage the towing gear. This is the principal object of the invention. Other objects will be apparent to those skilled in the art from the following description of the preferred embodiment of the invention which is shown in the accompanying drawings forming a part of this specification.

In said drawings:

Fig. 1 is a diagram showing a pair of tractor airplanes towing a glider by means of the towing gear of the invention;

Fig. 2 is a diagram showing the same aircraft immediately after the towing gear has released one of the airplanes;

Fig. 3 is a partly sectional elevation on a larger scale showing the pulley, the release member, and part of the towing rope;

Fig. 4 is a view like Fig. 3, but showing the parts at the moment of release;

Fig. 5 is a top plan view of the pulley; and

Fig. 6 is a sectional elevation of the pulley, showing the end of the towing rope engaged, as it will be after release has been effected.

Referring particularly to the drawings, Fig. 1 shows a pair of tractor airplanes 11, 12 each having a swivel towing eye 13 (or similar member) secured to the tail. A towing rope 14 is attached at one end to the towing eye 13 of airplane 11 and is trained around a sheave 15, thence to a releasing device 16. Another towing rope 17 is attached at one end to towing eye 13 of airplane 12 and has a connection at its other end with the releasing device. The glider 18 is towed by rope 19 attached to a coupling device including the sheave 15, and the tractor airplanes are connected to the sheave through ropes 14 and 17.

The coupling device comprises the grooved sheave 15 rotatably mounted on a yoke 20, said yoke having an integral pin 21 on which a rope coupling 22 is swiveled. Rope 19 is tied to an eye 23 in rope coupling 22. Yoke 20 also has a short bore 24 which is spaced from and disposed tangentially to the bottom of the groove in the sheave, bore 24 being adapted to receive rope 14 and hence being of larger diameter than that of the rope. The extremity of rope 14 has a swaged terminal 25 with a ball-shaped end, and a counterbore 26 at the outer end of bore 24 is shaped to receive terminal 25. A slot 27, which opens into the side of bore 24 and counterbore 26, is wide enough to permit the terminal 25 to move laterally into said bore and counterbore.

The releasing device 16 consists of an eye member 28, to which rope 17 is tied, said eye member being secured by screw threads 29 and a pin 30 to a plunger or rod 31 reciprocable in the body of the releasing device. Preferably the body of the releasing device has a central bore 32 in which a cylindrical metal insert 33 is placed, and the ends of the metal insert may be upset or enlarged as shown in Fig. 3 to secure the insert against movement.

A coil spring 34 is housed within bore 33a of insert 33 and surrounds the plunger or rod 31, and being compressed, bears at one end against a circular flange or shoulder 35 on the interior of the insert 33, and hence fixed within the releasing device. The other end of the coil spring bears against the end 36 of eye member 28, which is also inside the insert. On the other side of the flange 35, plunger 31 has an enlarged head 37 which may have the form of a clevis, and a pair of jaws 38, 39 are hinged between the arms of the clevis by means of a pin 40. Spring 34 as it expands tends to move the assembly comprising the plunger 31, eye member 28 and clevis head 37 to the left, as the parts are shown in Fig. 3. Cam surfaces 41, 42, are formed on the end of the insert 33 to act on the jaws 38, 39 to cause them to close around the swaged terminal 25 to secure the rope 14 temporarily to the releasing device. Clevis head 37 may abut the circular flange or shoulder 35 when the jaws are completely closed. The jaws will open as soon as the tension on rope 17 is relieved and body 16 contacts sheave 15 and yoke 20 which effects sliding of the plunger and contraction of the spring, as shown in Fig. 4; and as the jaws spread apart they are received in a pocket 43 formed in the body of the releasing device. Thus rope 14 is freed from the releasing device and rope 17.

Operation

Assuming that the glider and the airplanes 11, 12 are on the ground ready to take off, and that rope 14 is secured to airplane 11 and trained around the sheave, with its swaged terminal 25 gripped between the jaws 38, 39 while rope 19 is secured to the sheave and glider and rope 17 is secured to airplane 12 and the releasing device. Now airplanes 11 and 12 will start, and the two airplanes take off together, which launches the glider almost immediately. When the glider has reached a predetermined altitude, the pilot of airplane 12 will gradually lower the speed to fall behind airplane 11, and when by this process the releasing device is in contact with the sheave, the tension on rope 17 will slacken, while rope 14 continues under tension, which will cause the jaws to open, as illustrated in Fig. 4. The releasing device will now be freed of rope 14 and will fall away from the pulley, as shown in Fig. 2. Rope 17 may now be reeled in by means well known in the art. Airplane 12 may return to the field from which it was launched, while airplane 11 proceeds to tow the glider to the desired objective.

Obviously a plurality of gliders or targets may be towed instead of a single glider, or even another airplane. Whether an airplane or a glider is to be launched and towed, it may have pilot-controlled means (not shown) to cut it loose from the towing gear at the proper time. Also the tractor airplanes may both drop the towing gear at any time, by employing well known mechanism. The described ropes may be of nylon, wire cable or other flexible strands. Various modifications may be made within the scope of the appended claims.

What is claimed is:

1. A releasing device of the character described comprising a body having a member slidable longitudinally thereof on the interior; a coil spring surrounding the member within the body and urging one end of the member outwardly beyond one end of the body, means on said member end to secure a rope thereto, the other end of the member being retracted within the body; rope-gripping means secured to said other end of the member and being wholly within the confines of the body; means within the body providing an abutment to limit sliding of the member in one direction as urged by said spring; cam means within the body and cooperating with the spring to move the rope-gripping means into rope-gripping position; the body having a pocket at one end to permit the rope-gripping means to separate within the pocket to release the rope upon sufficient relative movement of the slidable member and the body.

2. A releasing device for a towing mechanism which comprises a body having an opening therethrough, a gripping means medially disposed within said body and operable forwardly or rearwardly to gripping or releasing positions, respectively, said gripping means in either position being wholly within said body, a cable fitting near the rear end of said opening enlarged at one end for engagement by the gripping means and adapted at the other end for attachment of a towing cable, towing means attached to the forward end of said gripping means and having means for attachment to a towing plane, whereby the forward pull of said towing plane tends to hold said gripping means in the gripping position, a spring also urging the gripping means forward to the gripping position, said spring having a smaller force than the rearward pull on said cable fitting, whereby, when the forward force on the towing means and the rearward force on the cable fitting are in equilibrium, the spring is able to hold the gripping means in the gripping position, but when the forward pull on the towing means is slackened, the rearward pull on the cable end is able to overcome said spring and release said gripping means whenever the projecting rear end of said body contacts a relatively fixed member to cause relative rearward movement of said gripping means with respect to said body.

3. A releasing device for a two-tractor towing rigging which consists of a body having forward and rearward bores extending inwardly from the ends leaving a medially disposed constriction between said bores, a cable gripping device in the rearward bore comprising a clevis, a pair of cable gripping jaws hinged at the forward end to said clevis with the free ends of the jaws extending axially rearward, jaw operating cams carried by said body between which said jaws may be drawn forwardly to their gripping position or rearwardly to their releasing position, a jaw operating rod extending from the base of said clevis through said constriction and through said forward bore, to and beyond the end of said body, a coil compression spring fitted freely around said jaw operating rod and in said forward bore, a cable connecting ring, a hub on one edge of said ring secured to said rod and slidable on said forward bore one end of said compression spring reacting against said constriction and the other end against said hub, said rearward bore being enlarged at the outer end to permit expansion of said jaws when said jaws are drawn to their released position.

JOHN C. BEIRISE.

REFERENCES CITED

The following references are of record in the file of this patent:

UNITED STATES PATENTS

| Number | Name | Date |
|---|---|---|
| 1,418,783 | Fokker | June 6, 1922 |
| 1,423,164 | Skonnord | July 18, 1922 |
| 1,677,009 | Wiltsie | July 10, 1928 |

FOREIGN PATENTS

| Number | Country | Date |
|---|---|---|
| 399,756 | Great Britain | Oct. 12, 1933 |